Aug. 12, 1924.
C. C. REED ET AL
1,504,505
BUMPER
Filed Dec. 28, 1923
2 Sheets-Sheet 2
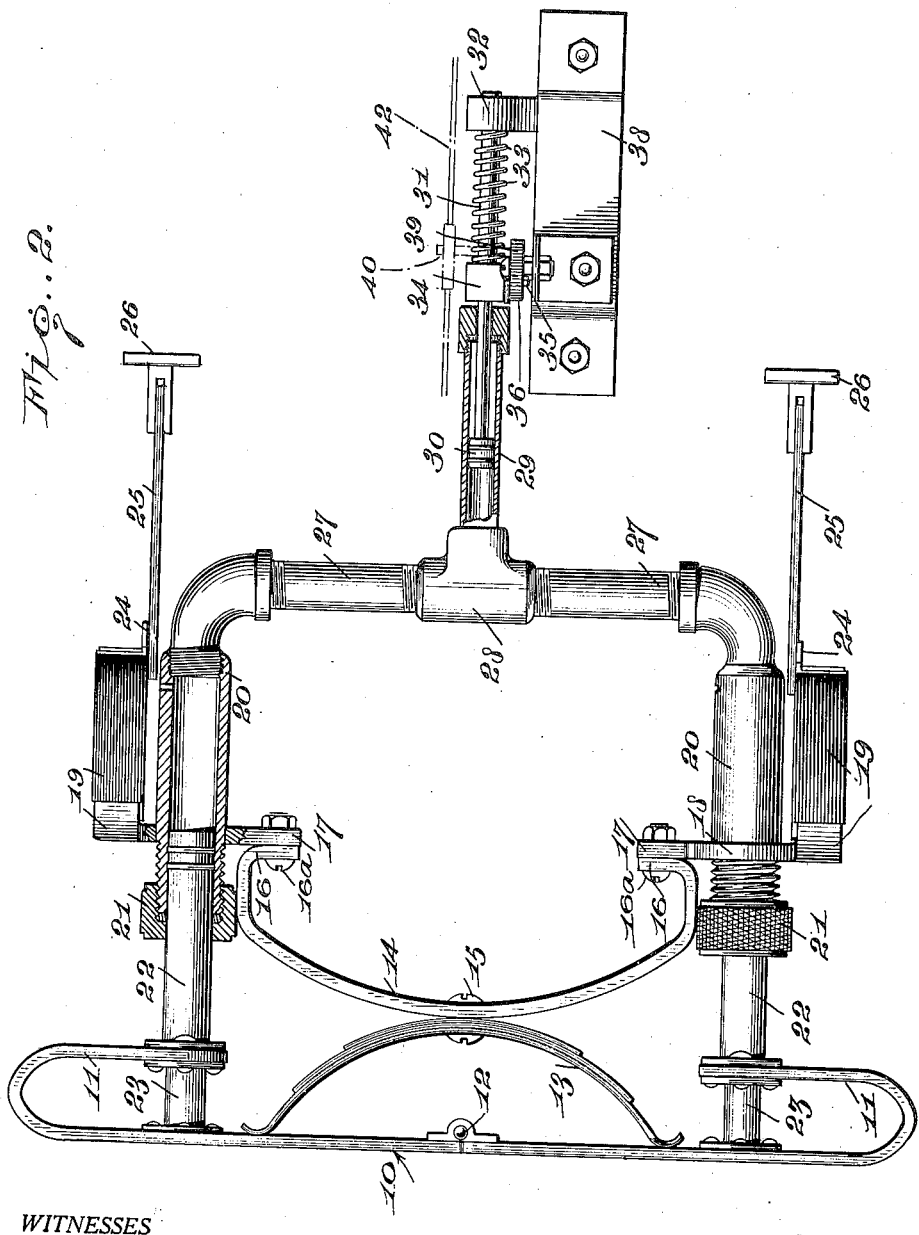
WITNESSES
M Fowler
INVENTOR
Clyde C. Reed
Hal. W. Watson
BY
Munn &co.
ATTORNEYS Patented Aug. 12, 1924.

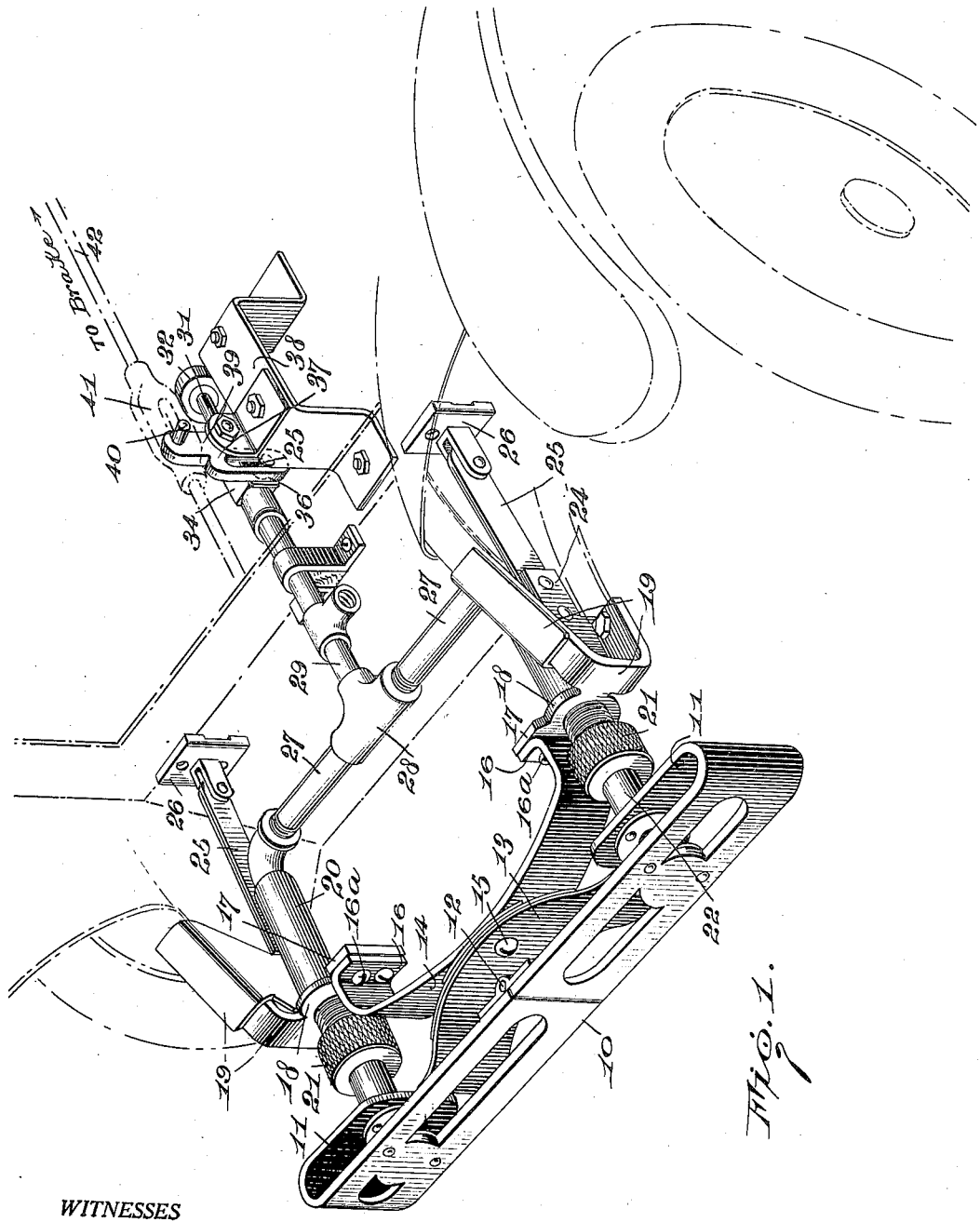

1,504,505

UNITED STATES PATENT OFFICE.

CLYDE CONRAD REED AND HAL W. WATSON, OF MEMPHIS, TENNESSEE.

BUMPER.

Application filed December 28, 1923. Serial No. 683,215.

*To all whom it may concern:*

Be it known that we, CLYDE C. REED and HAL W. WATSON, citizens of the United States, and residents of Memphis, in the county of Shelby and State of Tennessee, have invented certain new and useful Improvements in Bumpers, of which the following is a specification.

Our present invention relates generally to bumpers for automobiles and motor cars and more particularly to an air cushion bumper which will have much greater resistant qualities than the usual bumper depending entirely upon the spring quality of metal, and our invention further and particularly relates to a bumper and connections whereby the brake rod will be actuated and the brakes applied whenever the bumper sustains a shock sufficient for that purpose.

In presenting such an invention our primary object is to prevent as far as possible the loss of life and property due to collisions and we also aim to provide a bumper capable of action in accordance with our invention upon direct or even angular shock against either end portion thereof.

In the accompanying drawings which illustrate our present invention and form a part of this specification, Figure 1 is a perspective view illustrating in part the practical application of our invention, and, Figure 2 is a top plan view of the various parts constituting our invention.

Referring now to these figures we have shown generally in Figure 1, certain parts of a motor car to which our invention appears mounted at the front although it is to be understood from the following that with but slight and minor changes our improved bumper is just as readily attachable at the rear.

According to our invention the bumper per se, indicated at 10, has rearwardly bent and inturned ends 11 and is centrally divided into two similar sections hingedly connected as at 12 so that each section may yield in a rearward direction independent of the other. These bumper sections are normally supported in alined position by certain structure including a pair of oppositely bowed springs 13 and 14 secured together at their central portions as at 15 and the free ends of the former of which engage the two bumper sections approximately midway between their ends.

The inner or rear spring 14 has rearwardly curved and inturned ends 16 securely fastened as at 16ª to the inwardly projecting portions 17 of side brackets 18, the latter having outer side portions 19 formed to compass the forward extensions of the springs and spring supports of a motor vehicle or otherwise attach thereto. The brackets 18 have also formed in connection therewith or attached thereto a pair of cylinders 20 provided at their forward ends with stuffing boxes 21 through which plungers 22 enter the cylinders.

The plungers 22 are secured at their forward ends to, and rigidly project rearwardly from, the inturned ends 11 of the bumper, castings 23 being extended between each bumper section and the inturned end thereof, and connected thereto in line with the plungers 22.

The brackets 18 are further braced by rearwardly projecting portions 24 thereof connected to the forward ends of brace arms 25, the latter attached at their rear ends to blocks 26 in turn secured to convenient points upon the forward portion of the motor vehicle.

From the rear ends of the cylinders 20, pipes 27 lead toward one another to a centrally disposed T-coupling 28 which connects these pipes with a rearwardly extending pipe 29. This pipe 29 has therein a piston 30 adapted to be forced rearwardly when either plunger 22 moves rearwardly and brings about an increase of air pressure within the cylinder connections. The piston 30 has a rod 31 projecting rearwardly therefrom beyond the rear end of the pipe 29 and through a bearing member 32, being controlled by a spring 33 which normally tends to keep the rod and piston in the normal forward position.

The piston rod 31 also has a block 34 provided with a laterally projecting pin 35 disposed in the lower vertically slotted arm 36 of a brake actuating lever 37, said lever being fulcrumed upon a suitable support generally seen at 38 and having an upstanding arm 39 also provided with a laterally projecting pin 40 which projects through a lengthwise slotted head 41 attached to a lengthwise movable rod indicated at 42 which may be the brake actuating rod or a rod connected to the brake actuating rod.

It is thus obvious that when the piston rod 31 is shifted rearwardly under the before-stated circumstances, the rod 42 will be moved forwardly to bring about a sudden effective setting of the brakes in an emergency where for instance the operator of the vehicle under stress of the excitement of a sudden collision forgets or otherwise fails to do so. It is also obvious that the particular connections including the pin 40 and slotted head 41 permit of the free manual application of the brakes under ordinary circumstances.

When the bumper 10 forcibly engages anything as when it is struck by another vehicle or encounters a roadway obstruction and the like, either one or both of its sections move rearwardly depending upon whether the contact occurs against the center of the bumper or one of its ends only. If either end, however is shifted rearwardly its effect through its plunger 22 is to create sufficient increase in air pressure within pipe 29 to bring about a service application of the brakes and it is obvious that rearward movement of either one of the bumper sections is retarded by the air cushion thus formed.

We claim:

1. A bumper in two side sections hingedly connected at their adjacent ends and independently yieldable, a pair of centrally connected oppositely bowed springs, the free ends of one of which engage said bumper sections intermediate their ends, brackets to which the outer ends of the other spring are connected, air cylinders in connection with said brackets, and plungers extending rearwardly from the side sections of the bumper into said cylinders.

2. A bumper in two side sections hingedly connected at their adjacent ends and independently yieldable, a pair of centrally connected oppositely bowed springs, the free ends of one of which engage said bumper sections intermediate their ends, brackets to which the outer ends of the other spring are connected, air cylinders in connection with said brackets, plungers projecting from the side sections of the bumper into the forward ends of said cylinders, a pipe in communication with the rear ends of said cylinders, a piston in said pipe, and brake actuating connections operable by movement of said piston.

3. A bumper in two hingedly connected independently yieldable sections, spring members normally holding said sections in alined position, brackets forming supports for said spring members, air cylinders also supported by said brackets and plungers projecting rearwardly from the said sections of the bumper and into the forward ends of said cylinders.

4. A bumper in two hingedly connected independently yieldable sections, spring members normally holding said sections in alined position, brackets forming supports for said spring members, air cylinders also supported by said brackets and plungers projecting rearwardly from the said sections of the bumper and into the forward ends of said cylinders, and brake actuating connections operable upon rearward movement of either of said plungers within its respective cylinder.

5. A bumper in two hingedly connected independently yieldable sections, spring members normally holding said sections in alined position, brackets forming supports for said spring members, air cylinders also supported by said brackets and plungers projecting rearwardly from the said sections of the bumper and into the forward ends of said cylinders, a pipe in communication with the rear ends of said cylinders, a piston movable in said pipe and having an externally projecting rod provided with a laterally projecting pin, an upright lever fulcrumed at an approximately central point, having a depending slotted arm through the slot of which said pin extends, and also having an upstanding arm provided with a laterally projecting pin, and a member attachable to a brake rod including a longitudinally slotted head through the slot of which the last mentioned pin extends.

6. A bumper in two side sections hingedly connected at their adjacent ends and independently yieldable, a pair of centrally connected oppositely bowed springs, the free ends of one of which engage said bumper sections intermediate their ends, brackets to which the outer ends of the other spring are connected, air cylinders in connection with said brackets, and plungers extending rearwardly from the side sections of the bumper into said cylinders, a pipe in communication with the rear ends of said cylinders, a piston movable in said pipe and having an externally projecting rod provided with a laterally projecting pin, an upright lever fulcrumed at an approximately central point, having a depending slotted arm through the slot of which said pin extends, and also having an upstanding arm provided with a laterally projecting pin, and a member attachable to a brake rod including a longitudinally slotted head through the slot of which the last mentioned pin extends.

CLYDE CONRAD REED.
HAL W. WATSON.